United States Patent
Monte et al.

(10) Patent No.: US 8,060,082 B2
(45) Date of Patent: Nov. 15, 2011

(54) ANCILLARY TERRESTRIAL COMPONENT SERVICES USING MULTIPLE FREQUENCY BANDS

(75) Inventors: Paul A. Monte, San Jose, CA (US); Vijaya Gallagher, San Jose, CA (US); Anthony Navarra, Monte Sereno, CA (US)

(73) Assignee: Globalstar, Inc., Milpitas, CA (US)

( * ) Notice: Subject to any disclaimer, the term of this patent is extended or adjusted under 35 U.S.C. 154(b) by 1087 days.

(21) Appl. No.: 11/895,754

(22) Filed: Aug. 26, 2007

(65) Prior Publication Data

US 2008/0113666 A1    May 15, 2008

Related U.S. Application Data

(60) Provisional application No. 60/858,873, filed on Nov. 14, 2006.

(51) Int. Cl.
*H04W 4/00* (2009.01)

(52) U.S. Cl. ........................................ 455/427; 455/12.1

(58) Field of Classification Search ............... 455/550.1, 455/552.1, 553.1, 12.1, 13.1, 13.2, 27–430, 455/446–452.1
See application file for complete search history.

(56) References Cited

U.S. PATENT DOCUMENTS

| | | | |
|---|---|---|---|
| 6,859,652 B2 * | 2/2005 | Karabinis et al. | 455/427 |
| 7,113,743 B2 * | 9/2006 | Karabinis | 455/12.1 |
| 7,418,236 B2 * | 8/2008 | Levin et al. | 455/12.1 |
| 2002/0146979 A1 * | 10/2002 | Regulinski et al. | 455/13.1 |
| 2007/0087690 A1 * | 4/2007 | Karabinis | 455/12.1 |

* cited by examiner

*Primary Examiner* — Kent Chang
*Assistant Examiner* — San Htun
(74) *Attorney, Agent, or Firm* — Perman & Green, LLP

(57) ABSTRACT

A satellite radio telephone system employing at least two space-based components, each of which is configured to communicate with a plurality of radio telephones. Each space-based component employs its own frequency band and its own air interface and includes an ancillary terrestrial component that is configured to communicate terrestrially with a plurality of radio telephones over their frequency bands and air interfaces.

Figure 1:
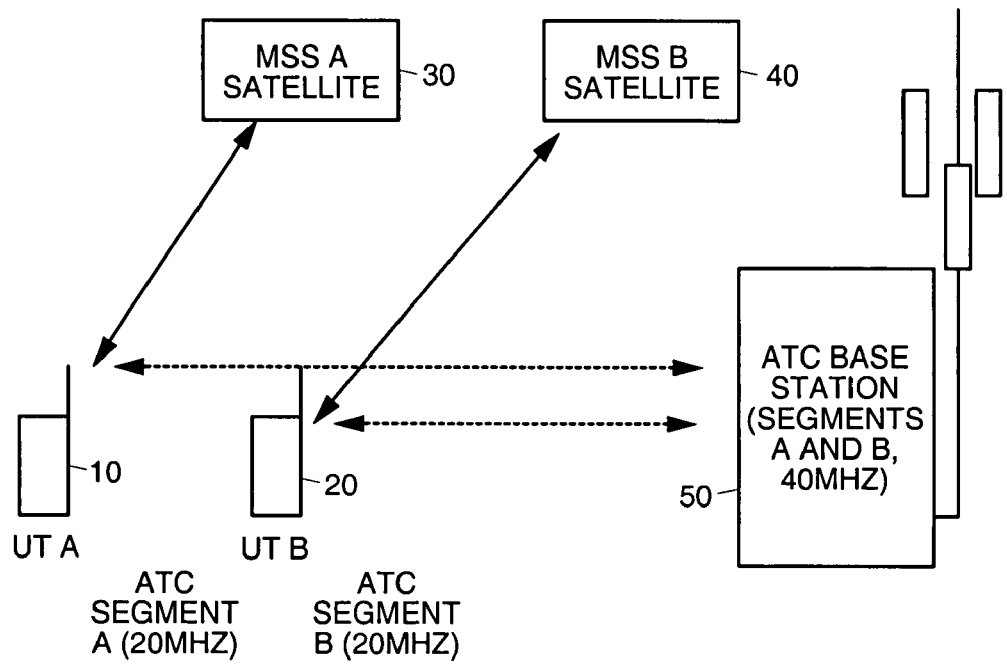

9 Claims, 1 Drawing Sheet

ANCILLARY TERRESTRIAL COMPONENT SERVICES USING MULTIPLE FREQUENCY BANDS

I. CLAIM OF PRIORITY FROM COPENDING PROVISIONAL PATENT APPLICATION

This application claims priority under 35 U.S.C. 119(e) and 120 from provisional patent application No. 60/858,873, filed on Nov. 14, 2006, the disclosure of which is incorporated herein by reference in its entirety.

II. FIELD OF THE INVENTION

The present invention relates to satellite radio telephone systems and methods. More specifically, the present invention relates to mobile satellite systems employing an augmented terrestrial component.

III. BACKGROUND OF THE INVENTION

It is known that satellite radio telephones have been developed and deployed throughout the world, especially where topographical conditions preclude use of conventional mobile radio telephones or fixed wire telephones, for example in rugged terrain areas or sparsely populated areas. These systems typically are understood to provide both voice and data communications so that they may include terminals such as PCS terminals.

Prior art satellite radio telephone systems may be broadly classified into two types: mobile satellite radio telephone systems and fixed satellite radio telephone systems. In each of these systems, one or more satellites are used to communicate with radio telephones, the satellites being either orbiting satellites or geostationary satellites. Typically, a mobile satellite radio telephone system is designed to communicate with a plurality of mobile radio telephones of similar size as conventional cellular radio telephones, whereas a fixed satellite radio telephone system is designed to communicate with a plurality of fixed or non-mobile radio telephones using large, permanent or semi-permanent fixed antennas which may be mounted on buildings or homes. The satellite signals to/from the fixed radio telephones are usually further distributed to a large number of users via a terrestrial, wired network.

Consequently, it has been found that the capacity of fixed satellite radio telephone systems (as measured by total number of users served) is much larger than that associated with mobile satellite radio telephone systems. In particular, a significantly lower number of users is served than in a fixed satellite system.

Generally, the per-satellite capacity of a satellite radio telephone is limited by the amount of satellite power that is expended per communication circuit in order to establish and maintain communications with a radio telephone. In addition, limiting factors such as available frequency spectrum and the typically poor frequency reuse of satellite radio telephone systems impact the per-satellite capacity of these phones.

Consequently, mobile satellite radio telephone systems have been found to generally possess much lower capacity than fixed satellite radio telephone systems. Both regional and global mobile satellite systems are found to be quite limited in capacity. Regional mobile satellite systems involving geostationary satellites have, for example, a capacity per satellite of about 10,000 simultaneous voice circuits. Global mobile satellite systems involving both medium earth orbiting satellites, or MEOs, or low earth orbiting satellites, or LEOs, generally have even lower capacity per satellite, having on the order of 3,000-4,000 simultaneous voice circuits.

It is understood that the per-satellite capacity of mobile satellite radio telephone systems is the amount of power that is expended per communication by the satellite payload in order to establish and maintain communications with the small hand-held mobile phones. The practical limitations involved in forming a very large number of spot beams from the satellite often limits frequency reuse for mobile satellite radio telephone systems, resulting in generally low capacities of the systems.

In contrast, fixed satellite radio telephone systems generally have higher capacity than mobile systems, since they employ fixed user terminals which can use relatively large end user antennas. The satellite power required per equivalent communication is found to be lower for a fixed system than for a mobile system. In addition, frequency allocations of the fixed systems are found to be more liberal than those of mobile systems due to the fact that fixed systems generally operate at higher frequencies, such as C-band or above, where the frequency spectrum is not as crowded, and user terminals are fixed and use highly directional antennas so that angular separation between satellites can be relied upon for frequency reuse.

Prior art methods have been developed to increase the relatively limited capacity of mobile satellite radio telephone systems experiencing capacity bottlenecks or hot spots which are developed in congested areas of the mobile satellite radio telephone system where the mobile satellite radio telephone system (MSS) does not have enough capacity to accommodate all users. It has been found that it is difficult to increase the capacity of the MSS in these congested areas.

Consequently, methods and systems to increase the capacity of a MSS include allowing an MSS to use some of the capacity of a fixed satellite system in areas of congestion, such as disclosed in U.S. Pat. No. 6,052,586.

In addition to improving cellular satellite communication systems and methods to provide wireless communications employing at least one space based component, such as one or more satellites that are configured to wirelessly communicate with a plurality of radio telephones or other types of cellular terminals, hybrids of satellite and terrestrial systems have been developed and used wherein terrestrial networks enhance cellular satellite communications system availability, efficiency and/or economic viability by terrestrially reusing at least some of the frequency bands allocated to cellular satellite communication systems.

Cellular satellite communication systems experience difficulty in reliably serving densely populated areas where the satellite signal may be blocked by high rise structures or may not penetrate into buildings. In such cases, the satellite spectrum may be underutilized or unutilized in such areas. It is found that the use of terrestrial retransmission can reduce or eliminate this problem. Thus, the capacity of the overall system can be increased significantly by the introduction of terrestrial retransmission since terrestrial frequency reuse can be much denser than that of a satellite-only system. It is further found that capacity can be enhanced where it may be mostly needed, for example, densely populated urban/industrial/commercial areas so that the overall system can become much more economically viable as it may be able to serve a much larger subscriber base.

One example in the prior art of terrestrial reuse of satellite frequencies is described in U.S. Pat. No. 5,937,332 entitled "Satellite Telecommunications Repeaters and Retransmission Methods". As is generally described therein, satellite communication repeaters are provided which receive, amplify and locally retransmit the downlink signal received from a satellite, thereby increasing the effect of downlink margin in the vicinity of the satellite telecommunications repeaters and allowing an increase in the penetration of uplink and downlink signals into buildings, foliage, transportation vehicles and other objects which can reduce link and margin.

Methods and systems in the prior art allow a satellite radio telephone frequency to be reused terrestrially within the same satellite cell while allowing intrasystem interference to be reduced. These systems include a space-based component such as a satellite that is configured to receive wireless communications from a first radio telephone in a satellite footprint comprising one or more cells over a satellite radio telephone frequency band. An ancillary terrestrial network is also provided that comprises one or more ancillary terrestrial components configured to receive wireless communications from a second radio telephone in the satellite footprint over the satellite radio telephone frequency band. The wireless communications from the second radio telephone are also received by the space based component in the satellite footprint over the satellite radio telephone frequency band as interference, along with the wireless communications that are received from the first radio telephone in the satellite footprint over the satellite radio telephone frequency band. In such cases, an interference reducer is employed that is responsive to the space based component and to the ancillary terrestrial network and that is configured to reduce the interference from the wireless communications that are received by the space based component from the first radio telephone in the satellite footprint over the satellite radio telephone frequency band using the wireless communications that are received by the ancillary terrestrial network from the second radio telephone in the satellite footprint over the satellite radio telephone frequency band.

Other wireless communications systems including a satellite gateway coupled to a communications network and operative to communicate with a communications satellite include a terrestrial terminal interface subsystem operative to communicate with a satellite gateway via the communications satellite using a first radio interface and to communicate with wireless terminals over a geographic area using a second radio interface, for example, as is discussed in U.S. Pat. No. 6,856,787.

Other cellular systems include a space based system having a first set of cells and a ground based system having a second set of cells. In such systems the space and ground systems can optionally function substantially autonomously with each using spectrum from at least one predetermined frequency band, for example, as is discussed in U.S. Pat. No. 6,859,652.

Prior art mobile satellite systems employing radio telephones or MSS are known in the art; for example, in U.S. Pat. No. 5,303,286 assigned to Globalstar®, a satellite communication system has at least one, but usually a plurality, of orbiting satellites over a terrestrial satellite service area, a satellite control center and a plurality of terrestrial communication links, wherein call setup is controlled by processors and databases onboard the orbiting satellites, and wherein only after the satellite link for the communication channels is completed, does control and switching rely on ground-based systems such that the orbiting satellites are integrated into a ground based telephone network and tariff structure.

In U.S. Pat. No. 5,715,297 assigned to Globalstar®, there is disclosed a radio communication system capable of servicing a roaming user or the like outside the range of terrestrial relay stations which includes a packet switched network and database of roaming users and a satellite communications system having at least one, but usually a plurality, of orbiting satellites over a terrestrial satellite service area, a satellite control center and a plurality of terrestrial communication links, wherein call setup is controlled by processors and databases onboard the orbiting satellites, and wherein only after the satellite link for the communication channels is completed, does control and switching rely on ground based equipment such that the orbiting satellites are integrated to a ground based telephone network and tariff structures. Similar systems and improvements thereto, as found in the U.S. Pat. Nos. 5,303,286 and 5,715,297 patents, include those discussed in U.S. Pat. No. 5,903,837 and U.S. Pat. No. 6,072,768. In addition, still other systems are discussed in U.S. Pat. Nos. 5,905,943 and 6,879,829.

Various other systems have been proposed as depicted in the FCC filing for "Authority to Launch and Operate a Satellite System to Provide Mobile Satellite Services in the 2 GHz Bands" dated Nov. 3, 2000, relating to the Globalstar® system, which is hereby incorporated by reference; the FCC filing in the matter of Mobile Satellite Ventures Subsidiary, LLC for "Minor Amendment of Application to Launch and Operate a Replacement L Band Mobile Service Satellite at 1010 West" dated Nov. 18, 2003; and the FCC filing by Thuraya which depicts a one GEO satellite system to provide a satellite telephone service; and the Iridium system produced by Motorola generally described in U.S. Pat. Nos. 5,918,176 and 5,490,087, in addition to the above recited Globalstar® systems.

In view of the above discussion, there continues to be a demonstrated need for systems and methods for terrestrial reuse of cellular satellite frequencies that can allow improved reliability, capacity, cost effectiveness and/or esthetic appeal for cellular satellite radio telephone systems, methods and/or satellite radio telephones. This is especially significant in view of the enormous costs associated with providing the satellites and launching them, in addition to monitoring them in orbit to efficiently and effectively provide satellite telephone services.

More recently satellite radio telephone systems have been provided employing multiple air interfaces and multiple frequency bands operating on the same satellite system having an ancillary terrestrial component (ATC). These prior art systems, such as that disclosed in U.S. Pat. No. 7,113,778 issued to Karabinis, are directed to mobile satellite systems (MSS) operators which have sufficient spectrum to provide an ATC component with the necessary frequency reuse. These and other systems, such as is disclosed in U.S. Pat. No. 7,113,778, are ineffective to provide a satellite radio telephone system having at least two operators in the MSS/ATC mode where each operator is found to have insufficient spectrum for efficient reuse in the ATC mode. Currently, systems are being developed to address this problem and provide an effective satellite radio telephone system employing multiple satellite systems with different air interfaces for the MSS component. These systems are to be contrasted with those provided in the prior art as in, for example, the system disclosed in U.S. Pat. No. 7,113,778 which is directed to one satellite system having multiple air interfaces. There is therefore seen to be a demonstrated need to provide systems devoid of the above noted prior art deficiencies.

IV. OBJECTS OF THE INVENTION

It is therefore an objective to provide a satellite terrestrial communication system and method of operation that facilitates effective spectrum assignment, usage sharing and/or reuse.

A further objective is to provide a satellite terrestrial communication system and method of operation thereof that minimizes interference between the satellite and terrestrial systems.

Still another objective is to provide a satellite terrestrial communication system and method of operation that enables at least a portion of the frequencies associated with an area of coverage to be utilized by a terrestrial system having overlapping coverage with a second area of coverage.

Again another objective is to provide a satellite terrestrial communication system and method that enables a terrestrial underlay system associated with a first area of coverage to reuse and/or share in a substantially central portion thereof at least a portion of the frequency spectrum of one or more adjacent areas of coverage of the satellite system.

Yet again another objective is to provide a two system communication system wherein frequencies associated with a first area of coverage for a first communication system are assigned, reused and/or shared in a second area of coverage associated with a second communication system.

Another objective is to enable assignment reuse and/or reassignment of satellite uplink and downlink channels in a non-paired manner.

A further objective is to provide a satellite terrestrial communication system in which the satellite and terrestrial components operate independently of each other while sharing at least a portion and optionally all of a common frequency band.

Another objective is to provide a satellite terrestrial communication system in which the satellite and terrestrial components operate independently of each other while utilizing discrete frequency bands.

Yet again, another objective is to provide a satellite terrestrial communication system and method of operation that minimizes interference between the satellite and terrestrial components.

Still again, another objective is to provide a satellite radio telephone system comprising at least two operators in an MSS/ATC mode where despite insufficient spectrum, efficient reuse in the ATC mode is provided.

Yet still, a further objective is to provide an effective satellite radio telephone system employing multiple satellite systems with different air interfaces for the MSS component.

V. BRIEF SUMMARY OF THE INVENTION

The above-stated and other objectives may be accomplished, generally speaking, by providing a satellite radio telephone system employing at least two space-based components, each of which is configured to communicate with a plurality of radio telephones. Each space-based component employs its own frequency band and its own air interface and includes an ancillary terrestrial component that is configured to communicate terrestrially with a plurality of radio telephones over their frequency bands and air interfaces.

ATC services may be employed using different frequency bands; e.g., in the L and S bands. In one exemplary embodiment, different pieces of spectrum of approximately 10 MHz, for example, each at L band and different pieces of spectrum of approximately 10 MHz each at S band, all of which add up to 40 MHz to offer integrated MSS and ATC services. It is also possible that all 40 MHz will be at L band or S band. Each portion of the US band may be licensed to a different MSS provider. The goal sought to be achieved here is to provide MSS/ATC services using distinct user terminals (UTs) that support one or more of the MSS/ATC air interfaces using terminal devices that are comparable in size to terrestrial cellular.

The base station employed in an exemplary system may be developed to operate in all the frequency bands; i.e., the same transmit/receive equipment may be employed to support different frequency bands.

VI. BRIEF DESCRIPTION OF THE DRAWINGS

Figure 2:
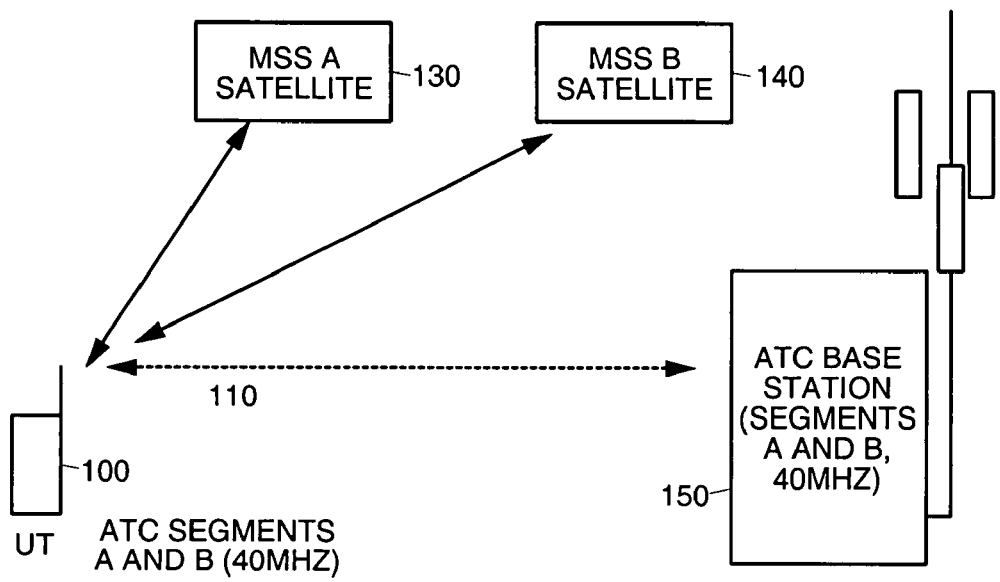

The above set forth and other features may be made more apparent in the ensuing Detailed Description when read in conjunction with the accompanying drawings, wherein:

FIG. 1 illustrates two types of user terminals; and
FIG. 2 illustrates a single multimode user terminal.

VII. DETAILED DESCRIPTION OF THE INVENTION

In FIG. 1 there is seen that two types of user terminals (UT) may be employed, user terminal A 10 and user terminal B 20; one for the air interface and frequency band of MSS operator A 30, and one for the air interface and frequency band of MSS operator B 40. A user subscribing to MSS provider A or B for the MSS portion of services in order to obtain coverage in different regions of the world, such as U.S. or Europe or coverage within a given region such as better coverage at northern latitudes versus temperate latitudes or different data rates or pricing plans or specific services like push-to-talk, may select either A or B on such bases. ATC Base Station segments A and B 50 at 40 MHz are seen to operate from MSS A 30 and MSS B 40.

In FIG. 2 there is seen a multimode UT 100 which is capable of operating in the entire 40 MHz band. The UT 100 employs air interfaces 110 and frequencies of either MSS operator A 130 or B 140 at any given time. ATC Base Station 150 is seen to operate from both MSS A 130 and MSS B 140 satellites.

In both FIGS. 1 and 2 the base stations 50, 150 are capable of operating in the entire 40 MHz band obtained by combining the two operators ATC spectra.

Any suitable transceiver may be employed in the exemplary communications system and method. Typical transceivers include transceivers comprising a receiver and a transmitter such as the one described in U.S. Pat. No. 5,303,286, for example. These suitable transceivers may be employed as either the first transceiver or the second transceiver in the exemplary system. Any suitable receiver may be employed in the transceiver. Typical receivers include a satellite communications receiver, a wireless receiver or a wireline communications receiver.

Any suitable transmitter may be employed in the exemplary system and method. Typical transmitters include those used to transmit wireless or satellite or wireline communications.

Any suitable satellite may be employed in the exemplary system and method. Typical satellites include LEO satellites, with or without onboard processing, MEO and GEO satellites, with or without onboard processing. These satellites can range from very low powered units, for example, bent pipe repeaters, up to and including very high powered satellites such as employed in GEO satellites.

In the case of the exemplary system, the ATC base station is configured to support both air interfaces of at least two air interfaces and the UT is designed to support both air interfaces, as in FIG. 2, or where two different UTs are employed, to support the two satellite air interfaces.

The exemplary system and method thereby allows aggregation of spectrum by two or more MSS/ATC operators who possess less than adequate amounts of spectrum to operate efficiently or wish to operate more efficiently with minimally adequate spectrum for efficient reuse in the ATC mode.

The exemplary system and method contemplate the use of multiple satellite systems having different air interfaces for each of the MSS components where the ATC component comprises a base station that supports both air interfaces or two or more air interfaces and the UT employed either supports two air interfaces, as in FIG. 2, or two different UTs support two satellite air interfaces.

Thus, it may be seen that an exemplary satellite radio telephone system employs at least two space-based components, each of which is configured to communicate with a plurality of radio telephones. Each space-based component employs its own frequency band and its own air interface and includes an ancillary terrestrial component that is configured to communicate terrestrially with a plurality of radio telephones over their frequency bands and air interfaces.

ATC services may be employed using different frequency bands; e.g., in the L and S bands. In one exemplary embodiment, different pieces of spectrum of approximately 10 MHz, for example, each at L band and different pieces of spectrum of approximately 10 MHz each at S band, all of which add up to 40 MHz to offer integrated MSS and ATC services. It is also possible that all 40 MHz will be at L band or S band. Each portion of the L/S band may be licensed to a different MSS provider. The goal sought to be achieved here is to provide MSS/ATC services using distinct user terminals (UTs) that support one or more of the MSS/ATC air interfaces using terminal devices that are comparable in size to terrestrial cellular.

The base station employed in an exemplary system may be developed to operate in all the frequency bands; i.e., the same transmit/receive equipment may be employed to support different frequency bands.

Consideration should be given to filters and tunable oscillators that cover different segments of L band and S band for time division duplexing (TDD) as well as frequency division duplexing (FDD). Antennas, low noise amplifiers (LNAs) and power amplifiers that operate over the entire frequency range for transmit or receive may be employed in the exemplary system, in addition to inter-modulation products that arise from simultaneously transmitting in different segments. Other base station considerations are directed to tunable oscillators and filters that operate over the different pieces of bandwidth available. Since 10 MHz is a small fraction of the center frequency of each spectrum piece, which is in the 1.6 GHz range and the 2 or 2.5 GHz range, it is found, for example, preferable to build filters that reject the other frequency segments for both the transmit and receive directions.

Alternatively, antennas, LNAs and power amplifiers may be designed to operate over the frequency range covering all the desired transmit and all the desired receive bandwidth. If it is desired to cover both L and S bands, it may be required to use different elements for each band which is likely to increase the cost and complexity of the system. Filtering and testing of inter-modulation products to insure compliance with out-of-band emissions requirements may add to the testing requirements but should not add to the complexity and cost of the system.

An advantage which the exemplary system presents to operators, unlike the case with a PCS spectrum, there is virtually no interference between different operators' systems, which can occur in some regions because the 1900 MHz PCS band (1850-1910 uplink and 1930-1990 downlink) overlaps with the 2100 MHz IMT-2000 band (1920-1980 MHz uplink and 2110-2170 downlink). The CDMA 2000 transmit may interfere with WCDMA Node B receivers and, similarly, in Europe, employing the GSM 1800 MHz band which overlaps partially with the CDMA US PCS band at 1900 MHz, is found to affect only roaming tri-mode phones.

Separate UTs for each MSS/ATC provider may be employed which operate in both the MSS and ATC mode while maintaining a size, weight and power comparable to terrestrial cellular. Thus, in MSS mode a given UT can operate only in MSS mode A (or B) but does not support the other MSS mode. Similarly, the UT may operate in only one of the ATC frequency segments, for example, the one corresponding to operator A, and can be served by any base station since all base stations operate in both segments. The burden of supporting multiple air interfaces is supported by the base station for ATC or the MSS infrastructure side for MSS to maintain a relatively simple UT. The handset size in the MSS mode is determined mainly by the size of the L/S band antenna gain needed to maintain efficient and effective service quality, given the modulation and coding scheme employed. It is found that when operating in the ATC mode, the antenna may be small and similar to terrestrial UTs.

With the advent of current chipsets that are being developed to support multiple modes, such as combinations of CDMA 1x or WCDMA and WiFi or WiMAX, it will soon be possible to build a single UT that can operate in any of the MSS/ATC bands; however, since MSS providers typically use different air interfaces, an increase in size and power of the handset in the case of two different MSS modes supported by the same handset will be experienced.

In the case of a four-mode phone with, for example, MSS Globalstar®, MSS MSV, ATC Globalstar®, and ATC MSV modes, the handset would be about the same size as the commercially available MSS/ATC Globalstar® phone. The four-mode phone will employ additional filters and an oscillator that can tune over a wider band than with the MSS/ATC modes alone. In the case when only one frequency band is employed at a time, either the MSV or the Globalstar® band, there is found to be no difference from regular cellular operation where a phone cannot be using two different frequencies except during handoff.

With regard to modulation and bandwidth considerations, air interfaces currently being considered for ATC use employ, for example, some version of WCDMA or CDMA 2000 1x or WiMAX. Satellite air interfaces for the MSS component may, for example, be either CDMA or TDMA based. For example, Globalstar® employs CDMA which is a variant of the terrestrial CDMA-one adapted for satellite communication.

CDMA-one employs 1.23 MHz bandwidths, WCDMA employs 5 MHZ bandwidths and WiMAX employs varying bandwidths. It is to be noted that the CDMA 2000 1x and WCDMA standards, while still in development, have been employed commercially in many products worldwide.

The IEEE 802.16 standard, which is the basis for WiMAX products, has several versions and is experiencing continuing development. The first WiMAX certified products which are just starting to reach the marketplace support the 802.16-2004 standard which has TDD and FDD modes employing only defined fixed units. Around July 2005 when the initial certification of products was underway, WiMAX Forum certified 3.5 GHz units with 3.5 MHz channelization in TDD and FDD modes. Mobility features were added only in 802.16e products which were expected to be commercially available in late 2006. This version will support multiple channelization schemes including 1.25 MHz, 2.5 MHz, 5 MHz, 10 MHz and 20 MHz.

Employing the exemplary system, the advantage of frequency planning flexibility of the TDD modes is available in WiMAX in order to result in a total bandwidth that allows at least a 1 in 4 cellular reuse pattern to cover dense urban areas. In a TDD operation, for example, each of the 5.5 MHz segments at L and S band that Globalstar® is currently authorized for ATC could be used as one frequency for the 1 in 4 reuse scheme, assuming a 5 MHz bandwidth. The L and S band segments of another operator could then be used as additional frequencies for the reuse scheme.

It is found that when employing TDD, complications arise in sharing frequencies between MSS and ATC in the same region, since a given user terminal (UT) receives simultaneously from both a satellite and an ATC base station which results in added interference to the UT. It is found that when employing CDMA, however, additional interference at the UT usually requires increased power demand from the base station and thus reduced capacity but is found not to reduce the quality of service. Employing OFDM and frequency hopping or staggering results in a similar co-existence is likened to the case of CDMA.

In an architecture that employs multiple ATC segments which are combined, there are additional frequencies available so that it becomes easier to assign ATC frequencies where there are no MSS frequencies being employed, especially since urban areas require more ATC bandwidth and rural areas need more MSS bandwidth. Consequently, it is found advantageous to combine multiple segments of bandwidth for ATC and MSS into a unified architecture.

While the exemplary system and method has been particularly described with respect to its preferred embodiments, it will be understood that it is not limited to these particular elements or apparatus described in the preferred embodiments or the final structures depicted in the drawings. On the contrary, it is intended to cover all alternatives, modifications, and equivalents as may be included within the scope of the invention defined by the appended claims.

In addition, other methods and/or devices may be employed in the system as claimed with similar results. In particular, the scope of the exemplary system and method is intended to include, for example, those devices and methods having frequency reuse in a WiMAX system, which employs OFDMA (orthogonal frequency division multiplex access), providing at least a 1 in 4 cellular reuse pattern which is obtainable especially when using adaptive antennas at the base station. As this standard evolves, a reuse factor of 1, as in the case of CDMA, is possible using frequency hopping.

What is claimed is:

1. A satellite radio telephone system comprising:
a) at least two spaced-based components, each of which is configured to communicate with a plurality of radio telephones wherein each of the at least two spaced-based components employs its own frequency band and its own unique air interface; and
b) an ancillary terrestrial component that is configured to communicate terrestrially with the plurality of radio telephones over said own frequency band and said own unique air interface of each respective one of said at least two spaced-based components and an ancillary terrestrial component air interface different from said own unique air interface of each respective one of said at least two spaced-based components; and
wherein at least a portion of the own frequency bands of the at least two spaced-based components is associated with a first area of coverage of the ancillary terrestrial component; and
wherein the ancillary terrestrial component is further configured to reuse and/or share at least another portion of the own frequency bands of the at least two spaced-based component associated with one or more areas of coverage adjacent to the first area of coverage.

2. The radio telephone system as defined in claim 1 wherein the radio telephone communicating with a first space based component operates in a first frequency band and uses a first air interface, and the radio telephones communicating with a second spaced-based components uses a second frequency band and a second air interface.

3. The radio telephone system as defined in claim 1 wherein all of said plurality of radio telephones are equipped to operate over said own frequency bands and support said own unique air interfaces.

4. The radio telephone system as defined in claim 1 wherein the at least a portion of the own frequency bands of the one of the at least two spaced-based components associated with the first area of coverage to be utilized by a terrestrial system has overlapping coverage with a second area of coverage.

5. The radio telephone system as defined in claim 1 wherein the ancillary terrestrial component is associated with the first area of coverage and is configured to reuse and/or share a substantially central portion of the at least another portion of the own frequency bands of the at least two spaced-based components associated with one or more areas of coverage adjacent to the first area of coverage.

6. The radio telephone system as defined in claim 1 wherein frequencies associated with the first area of coverage of a first communication system are assigned, reused and/or shared in a second area of coverage associated with a second communication system.

7. The radio telephone system as defined in claim 1 wherein assignment reuse and/or reassignment of spaced-based component uplink and downlink channels is provided in a non-paired manner.

8. The radio telephone system as defined in claim 1 wherein the spaced-based and terrestrial components operate independently of each other while sharing at least a portion and optionally all of a common frequency band.

9. The radio telephone system as defined in claim 1 wherein the spaced-based and terrestrial components operate independently of each other while utilizing discrete frequency bands.

* * * * *